June 26, 1951
H. HEIMANN ET AL
2,558,704
RETAINERS FOR SHAFTS, PINS AND THE LIKE
Filed March 8, 1950
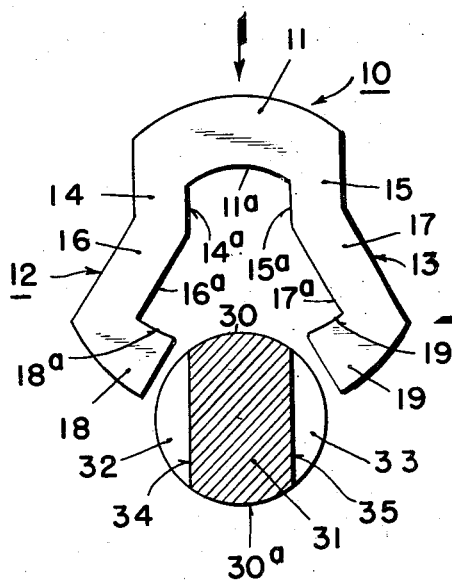
FIG. 1
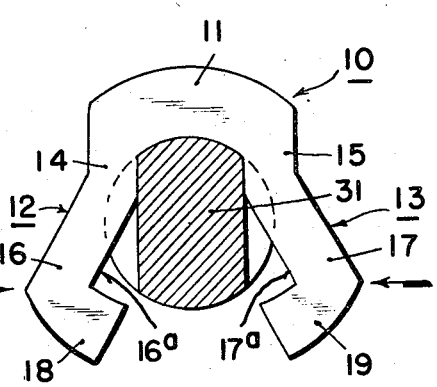
FIG. 2
FIG. 3
FIG. 4
INVENTORS
HEINRICH HEIMANN &
BY HUGO WURZEL,
Attorney Patented June 26, 1951

2,558,704

UNITED STATES PATENT OFFICE 2,558,704

RETAINERS FOR SHAFTS, PINS AND THE LIKE

Heinrich Heimann, New York, and Hugo Wurzel, Bronx, N. Y., assignors to Waldes Kohinoor, Inc., Long Island City, N. Y., a corporation of New York Application March 8, 1950, Serial No. 148,372

2 Claims. (Cl. 85—8.6)

1

This invention relates to improvements in retainers for shafts, pins and the like, and more particularly to an improved retainer capable of providing an artificial retaining shoulder for machine parts on shafts and pins provided on their opposite sides with notches or kerfs instead of the usual full-circular groove.

Conventional shaft retainers now in wide use are of open-ended ring form, being made from spring material so as to be capable of spring-seating themselves in a full-circular groove. Since such a ring-form retainer usually has a narrow width of gap between its open ends, it is assembled on shaft by being spread over the shaft end and then shifted axially therealong to the plane of the groove, and finally released to seat against the bottom of the groove with spring pressure. There are, however, certain retainer assemblies in which, for one reason or another, the provision of a full-circular groove in shaft is impractical, and the retainer must therefore seat in a non-circular groove, usually provided by notches or kerfs cut or otherwise formed in the opposite sides of the shaft. There are other assemblies which do not permit of the retainer being assembled on shaft by spreading it over the free end thereof and shifting it axially along the shaft, as aforesaid, but, instead, require the retainer to be assembled by being spread crosswise of the shaft directly in the plane of the groove.

Prior attempts to provide a retainer capable of forming a shaft shoulder and functioning satisfactorily under the aforementioned conditions have not been successful. In general, this resulted from the fact that the prior retainers for use with shafts having non-circular grooves as aforesaid took the form of a U-shaped spring clip or washer having parallel side arms seating in the notches or kerfs in the opposite sides of the shaft. Obviously, the holding power of such a retainer is small, giving unsecure seating of the retainer and the likelihood of the retainer slipping or jumping out of the notches under the high centrifugal forces occurring in assemblies rotating at high speeds.

A main object of the invention therefore is the provision of a retainer capable of forming an artificial shoulder on shafts having a non-circular groove, provided by notches or kerfs on its opposite sides, which additionally forms a positive lock preventing its displacement on or from shaft under any circumstances, and which may be assembled transversely to the shaft directly in the plane of the oppositely arranged notches.

2

More particularly, it is an aim of the invention to provide a clip-like retainer for shafts provided with a non-circular groove as aforesaid which may be closed by permanent deformation around substantially all of the shaft, that is to say, both along the parallel, straightway extending bottoms of the notches, and along the arcuate or peripheral portions of the shafts which extend between the ends of the notches.

Yet another object of the invention is the provision of a clip-like retainer characterized by a middle portion which is adapted to abut one of the two peripheral portions of the shaft extending between the notches and two integrally connected arms which are initially spread so as to facilitate assembly of the retainer transversely to the shaft, but which are adapted under deforming pressure to be brought into parallelism to abut the straight bottoms of the seating notches, and wherein the arms terminate at their free ends in inwardly directed locking lugs adapted in the assembled position to abut the opposite peripheral surface of the shaft extending between the other ends of the notches. Following assembly, such a retainer is closed substantially completely around the shaft and is positively locked to shaft, both axially and in cross-wise direction against any axial displacement and against movement out of the notches under centrifugal or other forces.

Still another object of the invention is the provision of a clip-like retainer which may be positively locked to the shaft on which it is assembled to rotate therewith, and which may accordingly be used to prevent rotation or oscillation of the machine part located thereby relative to the shaft.

A further object of the invention is the provision of a generally U-shaped retainer whose assembly transversely to shaft and in the plane of the seating notches is facilitated by the unique initial shaping of the arms thereof, which are so designed as to guide the retainer to its full seated position prior to the final locking-on operation, and which also insures that the forces required to lock the retainer to shaft may be readily and correctly applied.

The above and other objects and features of advantage of a retainer according to the invention will be seen from the following description thereof, accompanied by drawings, in which:

Fig. 1 illustrates a preferred embodiment of a retainer according to the invention in plan view before assembly on a shaft having a non-circular groove provided by oppositely arranged notches;

Fig. 2 is a view illustrating the retainer partly assembled on shaft;

Fig. 3 illustrates the retainer full-assembled on and locked to the shaft; and

Fig. 4 is a side view of the assembly illustrated in Fig. 3.

In the drawings, reference character 10 designates the improved retainer of the invention, which is made from permanently deformable material such as cold-rolled steel or even partly hardened steel. Said retainer comprises a body of general U-form, having a middle portion 11 and integral side arms 12, 13 depending therefrom in spaced relation. In the illustrated embodiment, the middle portion 11 is formed arcuate, and its inner edge 11a extends along an arc of curvature and length corresponding substantially exactly to the curvature and arcuate length of the peripheral portion 30 of the shaft 31, for which the retainer is designed, extending between the corresponding ends of the notches or kerfs 32, 33 formed in the opposite sides of the shaft and functioning as a non-circular groove therein.

In the preferred form of the invention, the side arms 12, 13 immediately adjacent the middle portion are formed with short-length, parallel portions 14, 15 whose straight inner edges 14a, 15a are spaced a distance corresponding to the thickness of shaft between the parallel straight bottoms 34, 35 of the shaft notches. From the parallel length portions the arms spread outwardly to provide divergent arm portions 16, 17 whose inner edges 16a, 17a are angularly related to the inner edges 14a, 15a of the parallel arm portions 14, 15. Preferably, the total length of each side pair of inner edges 14a, 16a, and 15a, 17a, equals the length of the bottoms 34, 35 of the shaft notches.

At their free ends, the side arms are provided with inwardly directed lug or hook portions 18, 19 having inner (upper) straight or arcuate edges 18a, 19a; if arcuate, said edges have radius approximating the radius of the inner edge 11a of the middle portion 11, and hence also approximating shaft radius. By design, the length of the lugs 18, 19 and the inclination of the divergent arm portions 16, 17 are such that the lugs are initially spaced a distance slightly in excess of the thickness of the shaft between the bottoms 34, 35 of the notches, so that the retainer may be freely slipped over the shaft without any further spreading of the retainer arms 12, 13. Moreover, the length of the lugs is such that when the retainer is closed on shaft, as in Fig. 3, a slight gap designated 36 is provided between the adjacent end edges of said lugs.

Referring to Fig. 2, a retainer according to the invention is preliminarily assembled on shaft by lining up the inner edges 14a, 15a with the bottoms 34, 35 of the seating notches and then pushing the retainer over the shaft until the inner edge 11a of the retainer middle portion abuts the arcuate portion 30 of the shaft surface. It will be seen that the provision of the parallel arm portions 14, 15 with straight edges 14a, 15a spaced substantially the thickness of the shaft between groove bottoms facilitates the preliminary assembly operation by guiding the retainer on to and hence properly locating it with respect to the shaft.

Upon the retainer being preliminarily assembled and located as in Fig. 2, inwardly directed pressure is applied to the divergent portions 16, 17 of the retainer arms which are thereby deformed inwardly so as to become aligned with the parallel leg portions 14, 15 of the retainer. Accordingly, the initially inclined edges 16a, 17a now coincide with the initially straight edges 14a, 15a and both said edges closely abut the groove bottoms.

In the deforming operation aforesaid, the lugs 18, 19 move in under the shaft and tightly abut the other peripheral surface portion 30a thereof, as seen in Fig. 3. To increase the gripping and hence the locking power of the lugs, the radius of their inner edges 18a, 19a may be slightly less than shaft radius, with the result that said edges bite into the material of the shaft generally as indicated at 37, 38 (Fig. 3).

Due to the fabrication of the retainer from a deformable non-spring metal such as cold-rolled steel, the deforming operation aforesaid results in the retainer being permanently set in the position in which it tightly embraces the shaft along both the peripheral portions extending between the ends of the notches as well as along the straight bottoms of the notches. However, disassembly of the retainer if and when required may be simply achieved by spreading the lugs 18, 19 away from each other, the gap 36 providing ample space for the insertion of the blade of a screw driver or similar tool, simple turning of the tool then resulting in spreading of the lugs and loosening of the retainer.

Without further analysis, it will be seen that a retainer as described achieves the desirable objectives set forth above. Although following the general U-form of prior clip-type retainers for shafts having a non-circular groove provided by oppositely disposed notches, the present retainer is of advantage in that it can be positively locked to the shaft against forces likely to cause the prior U-form retainers to slip or jump out of the groove. The present retainer may also be employed in retainer assemblies which, for one reason or another, do not permit the retainer to be assembled by spreading it over the shaft end. Again, since the retainer of the invention is positively locked to its shaft, it rotates therewith and hence may be used in assemblies where no rotation or oscillation of the machine part secured by the retainer relative to the shaft is desired or permissible.

It will be understood that the length of the parallel arm portions 14, 15 may be varied plus or minus from that shown and the parallel arm portions may even be dispensed with completely without departing from the scope of the invention, in which case reliance for locating the retainer rests on the curvature and arcuate length of the inner edge 11a of the retainer middle portion 11. Although the groove bottoms 34, 35 have been shown and referred to as extending on straight lines, they may be curved slightly, in which case the edges 14a, 16a and 15a, 17a of the arms may be correspondingly curved in whole or in part. Thus, as many changes could be made in carrying out the above constructions without departing from the scope of the invention, it is intended that all matter contained in the above description or shown in the accompanying drawings shall be interpreted as illustrative and not in a limiting sense.

We claim:

1. Retaining means for securing a machine part against axial displacement on a shaft, pin and the like provided with oppositely arranged notches serving as a non-circular groove, said means comprising a generally U-shaped body of deformable material having an arcuate middle portion and spaced arms integrally connected to the ends of the middle portion, the arms having parallel portions adjacent the middle portion and outwardly divergent end portions, the inner edges of said parallel portions being spaced apart a distance corresponding to the thickness of the shaft between the bottom of the notches, the combined length of the inner edges of the parallel and divergent portions of each arm substantially equaling the length of a notch bottom, the free ends of the divergent portions carrying inwardly directed arcuate lugs which are initially spaced apart a distance greater than the thickness of the shaft between notch bottoms, said arcuate middle portion and lugs having radius corresponding approximately to shaft radius, said divergent arm portions being deformable under pressure to take a position in which they extend parallel to one another and in alignment with the parallel portions of the arms, said lugs when the divergent arms are deformed as aforesaid substantially meeting one another whereby upon assembly said initially U-shaped body substantially encircles said shaft or pin.

2. A retainer adapted to provide an artificial shoulder on a shaft, pin and the like having a non-circular groove provided by oppositely disposed notches having substantially parallel bottoms, said retainer comprising a generally U-shaped body having a middle portion and spaced arms integrally connected therewith, said arms having parallel portions immediately adjacent the middle portion and divergent end portions, the free ends of the arms being provided with inwardly directed lugs, the inner edge of the middle portion having curvature and length corresponding to the curvature and arcuate length of the peripheral portion of the shaft extending between notches, the inner edges of the parallel arm portions being spaced a distance corresponding to, and the lugs being spaced a distance at least equaling, the thickness of the shaft between the bottoms of the notches, the length of the inner edges of the parallel and divergent portions of each arm substantially equaling the length of a notch bottom, and the inner edge of the lugs having a radius approximating the radius of the inner edge of the middle portion, said divergent arm portions upon the retainer being assembled on a shaft with the parallel arm portions seating in the notches being deformable under pressure into parallelism with each other and alignment with said parallel arm portions, said deformation also causing relative inward movement of the lugs to a position in which they lock the retainer to the shaft.

HEINRICH HEIMANN.
HUGO WURZEL.

REFERENCES CITED

The following references are of record in the file of this patent:

UNITED STATES PATENTS

| Number | Name | Date |
| --- | --- | --- |
| 902,205 | Brown | Oct. 27, 1908 |
| 1,493,089 | Walker | May 6, 1924 |
| 1,611,567 | Sonen | Dec. 21, 1926 |
| 2,025,848 | Collis | Dec. 31, 1935 |
| 2,261,415 | Schnell | Nov. 4, 1941 |
| 2,278,708 | Miller | Apr. 7, 1942 |